United States Patent Office 3,427,450
Patented Feb. 11, 1969

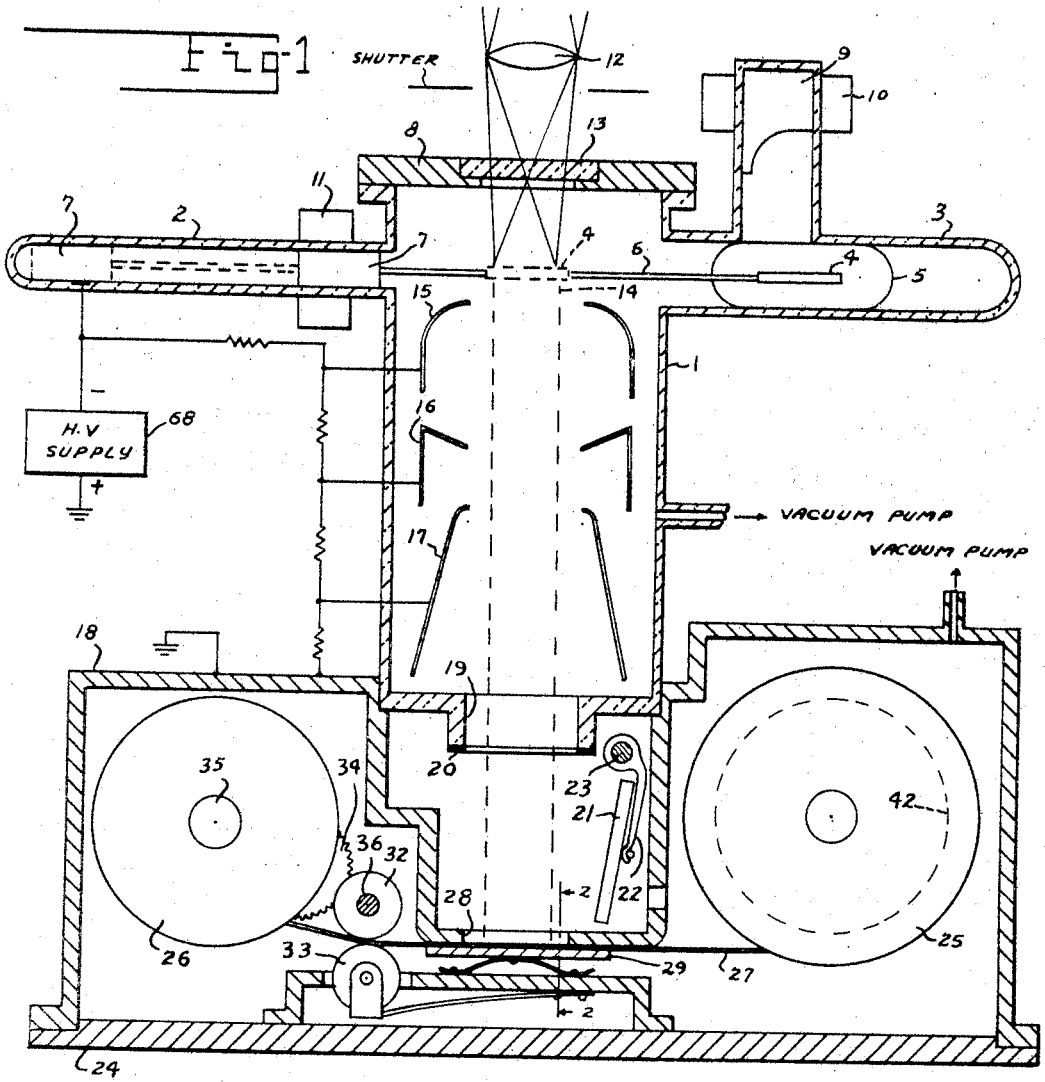
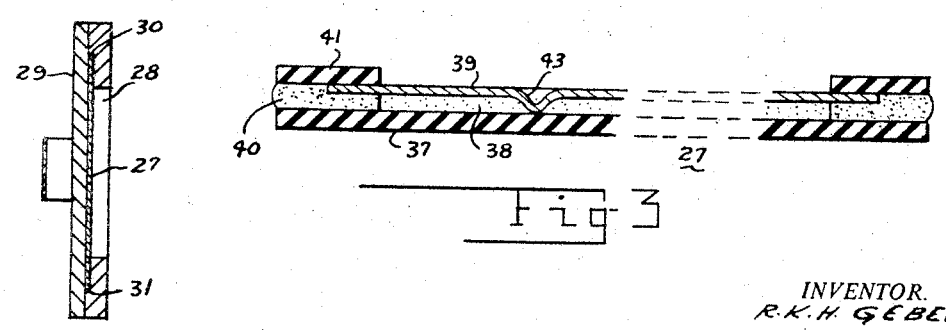

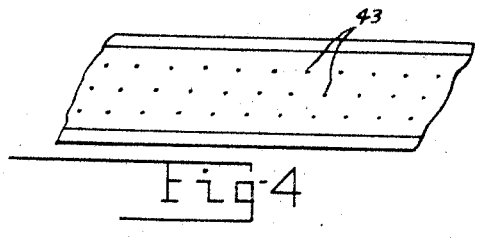
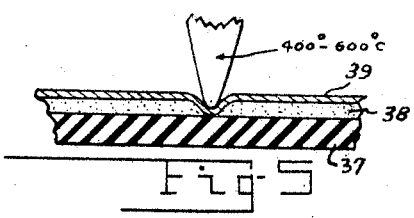
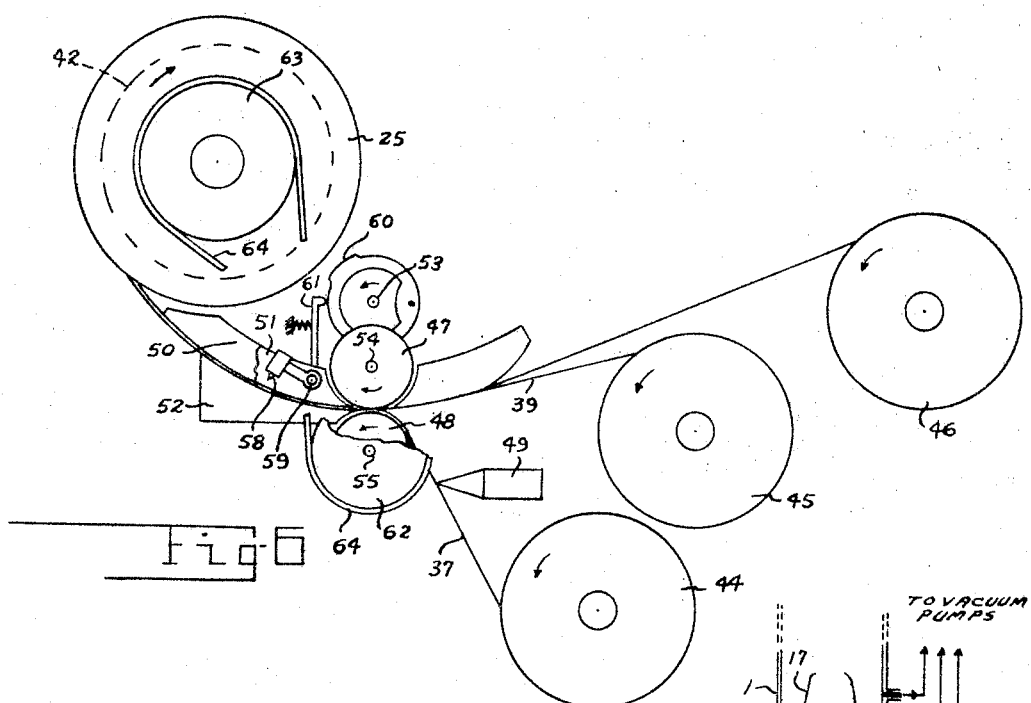
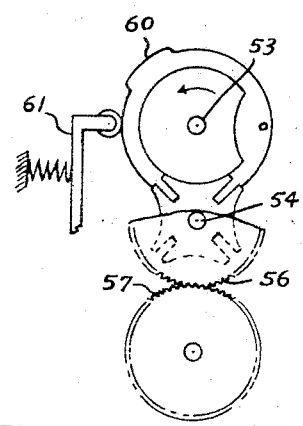
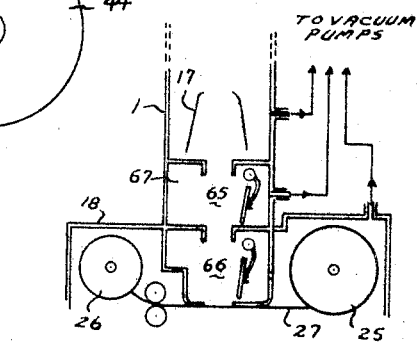

3,427,450
ELECTRONIC CAMERA UTILIZING SPECIAL FOIL COVERED FILM
Radames K. H. Gebel, Dayton, Ohio, assignor to the United States of America as represented by the Secretary of the Air Force
Filed Oct. 6, 1966, Ser. No. 585,226
U.S. Cl. 250—49.5                                  4 Claims
Int. Cl. G01n 23/04; H05g 1/60

ABSTRACT OF THE DISCLOSURE

An electronic camera designed for roll film, and a special film for use therein. The evacuated photocathode chamber of the camera communicates with a film compartment through a gas-tight gate, controllable from outside the camera, which, with the film compartment evacuated, is opened to admit the electron image to the film. The special film has a foil covering over the emulsion that is pervious to electrons but a barrier to water molecules in the emulsion.

---

The invention described herein may be manufactured and used by or for the United States Government for governmental purposes without the payment to me of any royalty thereon.

This invention relates to electronic cameras and has as its principal object the provision of an electronic camera in which a special film, rather than photographic plates, may be employed. A further object of the invention is the provision of an electronic camera in which the life of the photocathode is prolonged.

Electronic cameras have been successfully used to record images too faint for ordinary photography, such as occur, for example, in astronomical photography or night reconnaissance. Electronic cameras, the first of which was devised by A. Lallemand of the Paris Observatory, take advantage of the fact that a photocathode is more efficient in converting photons into photoelectrons than a photographic emulsion is in converting photons into developable silver halide grains, and the fact that high velocity electrons impinging directly on a photographic emulsion are much more effective in producing developable grains than are photons. For example, for a fine grain emulsion, about 1000 photons are required to produce one devolpable grain, whereas only 10 photons are required to produce an electron from a photocathode; and a single electron, accelerated to a sufficiently high velocity, can produce one or two developable grains in a photographic emulsion. Therefore, the electronic camera achieves a great increase in sensitivity over the ordinary camera by using a photocathode to convert the optical image into an electron image, accelerating the electrons of the image to a high velocity while maintaining their focus, and allowing the accelerated electrons to impinge directly on a photographic plate.

Because the loading of an electronic camera is complicated and time consuming and because only a limit number of photographic plates may be placed in the camera at one time, the number of exposures obtainable for each loading could be considerably increased by the use of film instead of plates. Therefore, as stated above, one of the objects of the invention is to provide for the use of film in an electronic camera. Further, a difficulty with electronic cameras is the rapid deterioration of the photocathode caused by moisture released from gelatin of the photographic emulsion when placed in an evacuated chamber with the photocathode. Accordingly, another object of the invention, as stated above, is to prolong the life of the photocathode by preventing water vapor from the emulsion from reaching it.

In accordance with the invention, the electronic camera is provided with a film compartment having the necessary provisions for receiving supply and take-up film spools, advancing and metering the film, and positioning the film to receive the electron image. The film compartment when closed is gas-tight and is separated from the gas-tight chamber of the camera containing the photocathode by a gas-tight gate controllable from outside the camera. This gate is closed during loading of the film compartment with film and during evacuation of the loaded compartment. It may then be opened to admit the electron image to the film. Further, in accordance with the invention, the photocathode is protected from water contained in the photographic emulsion on the film which would otherwise evaporate under the low pressure of the evacuated camera by the use of a special film which, in addition to using an emulsion of minimum water content, has the emulsion covered with aluminum foil thin enough to be pervious to electrons but thick enough to prevent passage of water molecules.

The invention will be described in more detail with reference to the specific embodiment thereof shown in the accompanying drawings in which, FIG. 1 is a section of an electronic camera incorporating the invention, FIG. 2 is a section taken along the plane 2—2 of FIG. 1, FIG. 3 is a cross section of the special film used in the camera of FIG. 1, FIG. 4 is an exterior view of the special film used in the camera of FIG. 1, FIG. 5 illustrates the method of spot welding the aluminum foil to the emulsion of the film, FIGS. 6 and 7 illustrate a suitable apparatus for making the special film used in the camera of FIG. 1, and FIG. 8 is a modification of FIG. 1.

Referring to FIG. 1, the electronic camera shown comprises a gas-tight container 1 having axially aligned oppositely extending closed tubes 2 and 3 which are part of an arrangement for placing the photocathode in operating position in accordance with known techniques. Briefly, the photocathode 4 is formed in evacuated capsule 5 and has a conductive support rod 6 extending through the capsule 5 and terminating in a cylindrical element 7 of magnetic material, such as iron, seated loosely in tube 2. End plate 8 is removable so that the photocathode assembly just described, which is prepared elsewhere, may be inserted into the camera. When the camera has been completely evacuated, a weight 9, held in place by magnet 10, is allowed to fall against glass capsule 5 by removal of the magnet in order to break the capsule away from the photocathode 4. A magnet 11 is then moved to the left carrying element 7 with it and thus drawing photocathode 4 to the left into its operative position, shown by dotted lines.

When the photocathode is in its operative position, an optical image may be formed on it by a lens system, represented by lens 12, through window 13 in end plate 8. This results in a corresponding electron image 14 being emitted from the opposite side of the photocathode. The electron image is maintained in focus and accelerated axially of the camera by means of suitable electrostatic electron optics represented by electrodes 15, 16 and 17.

Film container or magazine 18 forms a gas-tight seal with container 1 and communicates therewith through an opening 19 for which there is provided a gas-tight closure consisting of gasket 20 and cover plate 21. The cover plate may be brought into position and pressed against the gasket by arm 22 on shaft 23 which extends to the outside of the camera through a gas-tight shaft seal. Seals of this type are known in the art and are available for this purpose.

Film container 18 has a removable cover 24 to permit insertion and removal of film supply and take-up spools 25 and 26, respectively. Film 27 is held flat over opening 28 by pressure plate 29, the film running in guides 30 and 31 as shown in the sectional view of FIG. 2. The film may be transported by driving roller 32 which frictionally engages the film under the influence of pressure roller 33, the film having no sprocket perforations as seen later. A coupling, as by a gear train of which gear 34 is a part, exists between roller 32 and the spindle 35, which engages spool 26 through a slipping clutch to provide for taking up the film as it is advanced by the roller 32. The driving force may be applied to either shaft 36 of roller 32 or to spindle 35, one or the other being extended through a gas-tight rotary seal in container 18 for this purpose. A suitable film metering indicator may be driven from the external shaft to indicate when the film has been advanced one frame and to count exposures. For simplicity, the mechanisms for advancing and metering the film are not shown completely since these techniques are well known in the camera art and form no part of the invention.

A cross section of the special film used in the camera of FIG. 1 is shown in FIG. 3. In this figure, 37 is the plastic film base and 38 the photographic emulsion. The emulsion is covered by a layer of thin aluminum foil 39 sealed at the edges by cement 40 and protected by a strip 41 at each edge of the same material as the base film material. The film is wound on the supply spool 25 with the aluminum face inward so that when in position over opening 28 the foil faces the photocathode 4 and receives the electron image through opening 19. The spool should have a large minimum diameter, such as at 42, in order to prevent any permanent wrinkling of the foil when the film is wound on the spool. When the film is straightened under the pressure plate 29 any wrinkling that may have accurred due to winding on the spool will be removed and the foil slightly stretched to insure flatness against the emulsion. In order to maintain this flatness in a vacuum, particularly for larger films, the foil may be attached to the emulsion by small spot welds as at 43 in FIGS. 3 and 4. These may be made by a small heated point, as shown in FIG. 5, which causes the gelatin of the emulsion to melt and adhere to the foil.

One method of manufacturing a film of the type shown in FIG. 3 is illustrated in FIGS. 6 and 7. The film base 37 from supply spool 44, the foil 39 from supply spool 45 and the strips 41 from supply spool or spools 46 come together between driven rollers 47 and 48. Before reaching the rollers a suitable cement, such as one known commercially as Epoxy Hysol, is applied along the edges of the base strip by applicator 49. The composite film during manufacture is held in a slightly curved condition, with a radius of curvature only slightly greater than the average radius of spool 25, between guides 50 and 51 at the edges on the foil side and solid guide 52 on the base side. Shaft 53 is driven at constant speed, as by a motor (not shown), and in turn drives shaft 54, on which roller 47 is mounted, through a Geneva mechanism, as best seen in FIG. 7. Shaft 54 and shaft 55, on which roller 48 is mounted, are coupled by 1:1 ratio gears 56 and 57. A row of welding points 58, which may be electrically heated, are mounted on shaft 59 and are brought into contact with the foil for spot welding the foil to the emulsion, as previously described, through the action of cam 60 and cam follower 61 during periods when the rollers 47 and 48 are locked by the Geneva mechanism and the film is stationary.

Pulley 62, mounted on shaft 55, drives pulley 63 through belt 64, this pulley in turn driving spool 25 through a slip clutch.

To initially prepare the camera of FIG. 1 for use, an encapsulated photocathode assembly 4–6–7 is put in place and cover 8 replaced, and film is inserted in container 18 and cover 24 replaced. The containers 1 and 18 are then evacuated. Cover plate 21 may be in sealing position over opening 19 during the evacuation process or this passageway may be left open. When evacuation is completed, glass capsule 5 is broken away from photocathode 4 and the photocathode moved into operating position behind window 13, as previously described. When all exposures have been made on the film then in the camera, opening 19 is closed to preserve the vacuum in container 1 where the photocathode is located while container 18 is opened for removal of the exposed film and reloading. After container 18 has been closed and reevacuated, passageway 19 may be reopened. By maintaining the photocathode under vacuum at all times, it is not necessary to replace the photocathode each time the camera is reloaded and its useful life is prolonged. As added insurance against loss of vacuum in container 1, two gas-tight gates 65 and 66 may be used instead of the single gate of FIG. 1, with chamber 67 being connected to a vacuum pump. Both gates 65 and 66 are closed before opening container 18 for reloading and are held closed until the film container has been reevacuated, after which gate 66 is opened and later gate 65.

The photocathode is protected from the water in the gelatin of the emulsion on the film, which in a vacuum would ordinarily be released as water vapor, by the aluminum foil 39 covering the emulsion (FIG. 3). While the foil acts as partial barrier to the electron, nevertheless, with a foil thickness of 10 microns and an accelerating potential of 45 kilovolts (voltage of source 68), one developable grain in the emulsion will be produced for each 10 photons striking the photocathode, and by raising this voltage to 60 kilovolts, an average of 3 developable grains may be obtained for each 10 photons striking the photocathode.

The small spot welds 43 do not seriously interfere with the recorded image and these points on the developed film may serve as useful reference points. The foil must of course be removed before the film is developed. This may be accomplished by trimming the film along the edges of the photographic emulsion and lifting the foil off.

I claim:
1. An electronic camera comprising: an evacuated envelope having a transparent window; a photocathode opposite said window; a lens system positioned to form an optical image on said photocathode through said window whereby a corresponding electron image is produced by said photocathode; electron optical means for accelerating the electrons of said electron image while maintaining the focus of the image; a photographic film in said camera consisting of a plastic strip base having a photosensitive emulsion thereon and a thin sheet of aluminum foil covering said emulsion and sealed at the edges of said base; and means in said camera for positioning the film normal to the direction of travel of the electrons and so that the electrons impinge on said foil, the foil being of such thickness as to be pervious to said accelerated electrons but impervious to water molecules.

2. Apparatus as claimed in claim 1 in which said envelope is divided into two compartments, one containing said photocathode and the other containing said film; a passageway between said compartments for admitting said electrons to the film compartment; means actuatable from outside said camera for effecting a gas-tight closure of said passageway; and means individual to each compartment for connecting that compartment to an evacuating device.

3. Apparatus as claimed in claim 2 in which the means for closing said passageway comprises two cascaded gas-tight gates individually actuatable from outside said camera and in which individual means are provided for connecting the space in said passageway between said gates to an evacuating means.

4. Apparatus as claimed in claim 1 in which said emulsion contains gelatin and in which said foil is attached to said emulsion at regular intervals by small spot welds each produced by a heated point applied normal to said foil.

References Cited

UNITED STATES PATENTS

| 3,150,255 | 9/1964 | Wilska | 250—49.5 |
| 3,154,369 | 10/1964 | Day | 250—49.5 |

RALPH G. NILSON, *Primary Examiner.*

S. C. SHEAR, *Assistant Examiner.*

U.S. Cl. X.R.

250—65